O. T. CLORIUS.
AUTOMATIC HEAT REGULATOR FOR ROOMS OR THE LIKE.
APPLICATION FILED DEC. 9, 1915.
1,176,727. Patented Mar. 21, 1916.
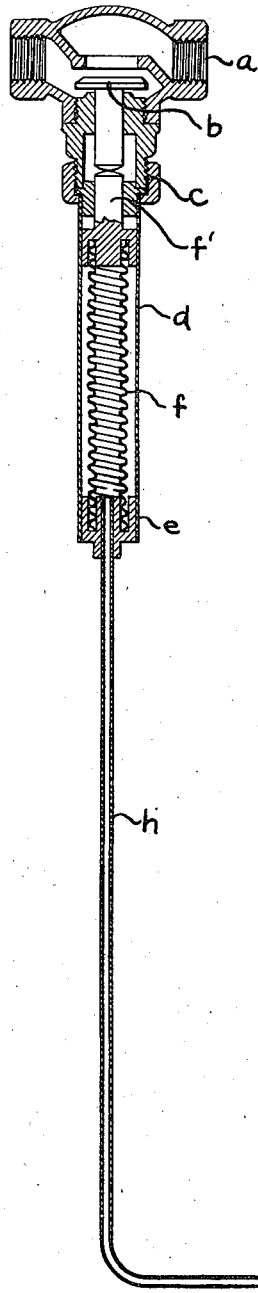
Fig: 1.
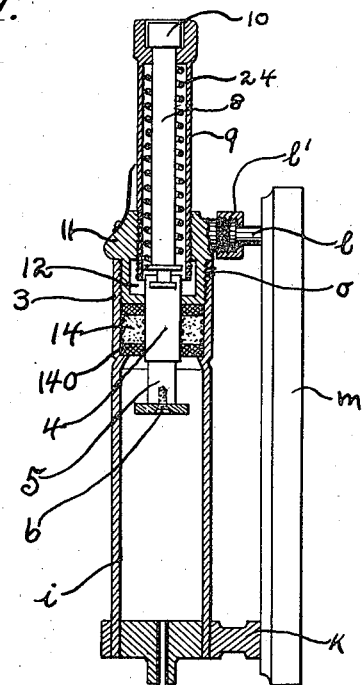
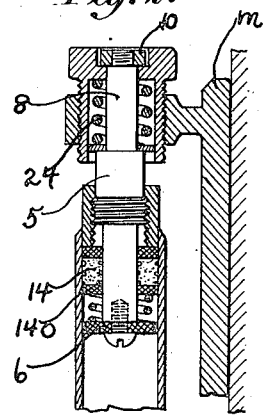
Fig: 2.
Inventor
Odin Thorvald Clorius
By his Attorney
Carl P. Goepel

UNITED STATES PATENT OFFICE.

ODIN THORVALD CLORIUS, OF NEW YORK, N. Y.

AUTOMATIC HEAT-REGULATOR FOR ROOMS OR THE LIKE.

1,176,727.

Specification of Letters Patent.

Patented Mar. 21, 1916.

Application filed December 9, 1915. Serial No. 65,984.

*To all whom it may concern:*

Be it known that I, ODIN THORVALD CLORIUS, a subject of Denmark, and a resident of Lille Stranvej S., Copenhagen, Denmark, at present residing in the borough of Manhattan, city, county, and State of New York, have invented certain new and useful Improvements in Automatic Heat-Regulators for Rooms or the like, of which the following is a specification.

My invention relates to that class of automatic heat regulators in which the expansion of a fluid contained in a container, caused by the heat, operates a closing valve for the heating medium, by means of a movable membrane or a corresponding device.

The object of my invention is to provide for an instant and reliable regulation of the passage of the said heating medium, and consists further in providing a relief filling-piston for the container containing said fluid, which is provided with a stuffing box and is controlled by means of a spring which operates against the pressure of the fluid, and preferably has an initial pressure which is greater than the highest possible friction between the piston and stuffing box, which spring gives way under excessive pressure and renders possible the cessation of the regulating temperature.

A membrane or corresponding movable device for the regulating valve can ordinarily only endure a pretty small change of shape, and its movement is further limited by means of projections. When now, as is often the case, the container of the fluid is still warm somewhat after the closing of the closure valve for the heating medium, the piston gives way, whereby an excessive rise of pressure is hindered. As soon as this harmful superheating ceases, the piston is moved back into its former position by the spring.

The piston can be moved outwardly or inwardly with respect to the container by means of a set screw, so that the inner hollow of the container can be changed. In this manner the temperature at which the regulating valve is influenced, is changed.

When the container of the fluid is completely filled, after the movable device for controlling the regulating valve has performed its greatest possible movement, the piston cannot be further pushed inward, and a forward screwing in of the set screw causes the intermediate spring to be pressed together and the piston can only press inwardly with a corresponding cooling of the container for the fluid. After drawing back the piston, it is possible to fill up with fluid to replace losses which occur because of the proportionally high working pressure.

I have set forth a preferred embodiment of my invention in the following desciption and drawings.

The same letters of reference indicate similar parts.

Figure 1 is a side section of the automatic heat regulator, and Fig. 2 is a side view of the container for the fluid and the appertaining parts thereof.

On the valve-housing $a$, provided with a valve $b$, a tube $d$ having a bottom $e$ is screwed on by means of a thread $c$. To the tube $d$ a metallic hose-like membrane $f$ is brazed or fastened in any suitable way. In the upper end of the membrane $f$ a spindle $f'$ is soldered in, which lifts the conical valve $b$ and can press it against its seat when the membrane $f$ is extended. The membrane is filled with fluid and is connected with the container $i$ for the fluid, that is, the expansion vessel by means of the pipe $h$. The container $i$ is fastened upon a wooden plate $m$ by means of two feet $k$ and $l$. The feet $k$ and $l$ are divided vertically into halves, which are connected by means of a screw coupling $l'$ as shown. This wooden plate $m$ is hung upon the wall of the room whose temperature it is desirable to regulate. Under the cover 11 of the container $i$ is a packing ring 14 of rubber or the like, which is made here preferably according to certain advantageous forms hereinafter to be described, but which may be of any ordinary and well-known type. This serves as a stuffing box for the piston for the container. On the container $i$, a loose metal ring 140 is placed, which fits on a shoulder or projection of container $i$. Upon this loose metal ring 140, a ring 14 of rubber is placed and above this the cover 11 is placed. The tube container $i$ has a projection 3 about the upper end thereof, which has an internal winding by means of which the cover 11 can be screwed into final position, when it can be connected to the foot $l$ by means of the coupling $l'$ as shown. The rubber ring 14 fits loosely so that it does not form a tight packing until it is compressed by the cover 11 when the cover 11 is screwed into final position. The piston 4 has a chamfered projection 5 with a disk 6 screwed thereupon, which projection 5 is longer than the bearing or stuffing surface between the lower part of ring 14 and the lower part of piston 4, whereby, after the piston 4 has been raised a certain distance, there is no longer a tight fit between the ring 14 and the portion of the piston in said ring, and any liquid in the container can stream past said ring 14. The cover 11 has extending upwardly therefrom a hollow set screw 9 containing a spindle 8 and a helical spring 24, which operates to force the piston 4 downwardly and against the pressure of the liquid, the spring being inwardly compressed, so that its force is greater than that of the friction of the piston 4 against its packing. The spindle 8 has a head 10 screwed thereupon, which rests in the head piece of the hollow screw 9. An auxiliary chamber 12 is provided in the upper part of the stuffing box, which communicates with the container $i$ when the piston has been raised a certain distance, as before described. The piston 4 and the spindle 8 are revolubly coupled together, so that they move in unison, so that the movement of the piston 4 can always be seen by the rise of the head 10, above the screw 9. The disk 6 is useful when it is desired to withdraw the packing ring 14 and for limiting the outward drawing of the piston. An air opening O is provided in 3.

The fluid with which the container $i$ is filled, is preferably one which has a large expansion when heated, and also works as a lubricating means, as for instance, glycerin. A mixture of alcohol and water may also be employed, in which case the piston and the rubber packing ring are smeared with fat. The set set screw 9 is connected to the cover 11 by means of coöperating screw windings.

The method of operation of my improved heat regulator is as follows: The head 11 is detached from the foot $l$ and screwed upwardly and out of the container, so that the ring 14 is relieved from pressure and fits loosely in its place. At the same time because of the revoluble coupling of the spindle 8 and the piston 4, the piston 4 is raised with the head 11, the head 11, spindle 8 and piston 4 maintaining the same relative positions, however. Since the portion of piston 4 adjacent to the inner surface of the packing ring 14 now fits loosely, a fluid can now be poured in or admitted into the container $i$ until no more can be poured in or admitted. The cover 11 together with piston 4 can be completely removed for the filling of container $i$. The cover 11 is now screwed down into its final position when the ring 14 is compressed and caused to fit tightly. Up to that time, the surplus fluid is permitted to escape through chamber 12, to the air, so that chamber 12 is maintained full, and the ring 14 does not become dry or affected by the dust, and the formation of crusts is prevented, an air opening being preferably provided. The container is now completely filled with the fluid, so that the slightest heating will cause the expansion of the membrane $f$. The set screw 9 is now screwed inwardly until the membrane $f$ is extended and operates the closing valve $b$. While all this is being done, the temperature of the container and fluid should be maintained at the temperature which is desired in the room. The exact installation to the desired temperature can be done easily if desired, by means of the screw 9. When the regulator is installed the room, and therefore the container also, can be heated to the desired temperature, and the regulator can then be adjusted. When the temperature rises above that desired, the expansion of the fluid, by means of the membrane $f$ and the valve $b$, causes the shutting off of the passage of the heating medium, which can be hot water, steam, hot air, or any other well known type, both this and the particular type of heater being immaterial for the purposes of this invention, and are therefore not shown. If, after the valve $b$ is operated, the temperature of the regulator still rises, the piston 4 is lifted against the resistance of the spring 24 acting on the spindle 8. After the piston 4 has been lifted a certain distance, the fluid can pass into the relief chamber 12, as this is now put into communication with the container $i$, as has before been explained. Any type of piston, of course, may be employed, instead of the plunger type herein shown. When the room cools again, the spring forces the piston 4 back into place.

I have described a preferred embodiment of my invention, but it is clear that numerous changes could be made in the details thereof without departing from the spirit thereof as defined in the appended claims.

I claim:

1. An automatic heat regulator for rooms and the like, comprising a container, a fluid in said container, the volume of said fluid changing in proportion to the changes in the temperature thereof, means for passing a heating medium through said room, a valve for regulating the passage of said medium, expansion means of the class described connected with said container and operated by said fluid for operating said valve, a piston connected with said container and adapted to be operated by the expansion of said fluid, and a spring operating to move said piston against the action of said fluid thereupon, said spring being initially strained so as to oppose an initial resistance greater than the frictional resistance of said piston against its cylinder, and greater than the resistance of said expansion means.

2. An automatic heat regulator for rooms and the like, comprising a container, a fluid in said container, the volume of said fluid changing in proportion to the changes in the temperature thereof, means for passing a heating medium through said room, a valve for regulating the passage of said medium, expansion means connected with said container and operated by said fluid for operating said valve, a piston connected with said container and adapted to be operated by the expansion of said fluid, and a spring operating to move said piston against the action of said fluid thereupon, said container having an auxiliary chamber connected therewith, and means for putting said auxiliary chamber into communication with said container, after said piston has been moved a given distance, whereby some of the liquid in said container then enters said auxiliary chamber, and the pressure against said piston is lessened.

3. An automatic heat regulator for rooms and the like, comprising a container, a fluid in said container, the volume of said fluid changing in proportion to the changes in the temperature thereof, means for passing a heating medium through said room, a valve for regulating the passage of said medium, expansion means connected with said container and operated by said fluid for operating said valve, a piston connected with said container and adapted to be operated by the expansion of said fluid, and a spring operating to move said piston against the action of said fluid thereupon, said container having an auxiliary chamber connected therewith, and means for putting said auxiliary chamber into communication with said container, after said piston has been moved a given distance, whereby some of the liquid in said container then enters said auxiliary chamber and the pressure against said piston is lessened, said chamber being located in the upper stuffing-box of said piston.

4. An automatic heat regulator for rooms and the like, comprising a container, a fluid in said container, the volume of said fluid changing in proportion to the changes in the temperature thereof, means for passing a heating medium through said room, a valve for regulating the passage of said medium, expansion means connected with said container and operated by said fluid for operating said valve, a movable stuffing ring, a piston passing through said stuffing ring and connected with said container and adapted to be operated by the expansion of said fluid, and a spring operating to move said piston against the action of said fluid thereupon, said piston having a disk spaced from said stuffing ring and connected to the lower end thereof, said disk being of greater diameter than the internal diameter of the stuffing box of said piston, whereby, when said piston is raised until said disk contacts with said stuffing ring, the further raising of said piston causes the raising of said stuffing ring.

5. An automatic heat regulator for rooms and the like, comprising a container, a fluid in said container, the volume of said fluid changing in proportion to the changes in the temperature thereof, means for passing a heating medium through said room, a valve for regulating the passage of said medium, expansion means connected with said container and operated by said fluid for operating said valve, a stuffing ring, a piston connected with said container and passing through said stuffing ring, and adapted to be operated by the expansion of said fluid, and a spring operating to move said piston against the action of said fluid thereupon, and said piston having a projection at the lower end thereof of smaller diameter than the internal diameter of said stuffing ring, said projection being longer than said stuffing ring.

6. An automatic heat regulator for rooms and the like, comprising a container, a fluid in said container, the volume of said fluid changing in proportion to the changes in temperature thereof, means for passing a heating medium through said room, a valve for regulating the passage of said heating medium, expansion means connected with said container and operated by said fluid for operating said valve, a piston connected with said container and adapted to be operated by the expansion of said fluid, a loosely fitting packing ring through which said piston moves, a movable cover for said container adapted to compress said loosely fitting ring and cause it to fit tightly when said cover is in its inmost and final position, means for moving said cover, and spring means connected to said cover for moving said piston against the action of the expansion of said fluid, said piston having a projection normally below the bottom of said packing ring, said projection having a disk of larger diameter than the internal diameter of said packing ring, and normally spaced from said packing ring.

7. An automatic heat regulator for rooms and the like, comprising a container, a fluid in said container, the volume of said fluid changing in proportion to the temperature thereof, means for passing a heating medium through said room, a valve for regulating the passage of said heating medium, expansion means connected with said container and operated by said fluid for operating said valve, a cover for said container, a chamber in said cover, a piston passing through said chamber into said container, a packing ring through which said piston passes, said chamber in said cover being normally closed, and means for connecting said auxiliary chamber with said container, after said piston has been lifted a given distance.

In testimony that I claim the foregoing as my invention, I have signed my name in presence of two subscribing witnesses.

ODIN THORVALD CLORIUS.

Witnesses:
  LEWIS MATTERN,
  ASBEN BLUM.